(12) United States Patent
Schmitt et al.

(10) Patent No.: US 7,584,898 B2
(45) Date of Patent: Sep. 8, 2009

(54) MANUAL OVERRIDE FOR ELECTRONIC PROPORTIONING VALVE

(75) Inventors: Randall Paul Schmitt, Clinton Township, MI (US); Jeffrey Belz, Eastpointe, MI (US)

(73) Assignee: Masco Corporation of Indiana, Indianapolis, IN (US)

( * ) Notice: Subject to any disclaimer, the term of this patent is extended or adjusted under 35 U.S.C. 154(b) by 638 days.

(21) Appl. No.: 11/173,247

(22) Filed: Jul. 1, 2005

(65) Prior Publication Data

US 2007/0001018 A1 Jan. 4, 2007

(51) Int. Cl.
*G05D 23/13* (2006.01)
*F16L 5/00* (2006.01)

(52) U.S. Cl. .................. 236/12.12; 137/359; 137/360

(58) Field of Classification Search .............. 236/12.11, 236/12.12, 93 R; 137/357, 359, 360
See application file for complete search history.

(56) References Cited

U.S. PATENT DOCUMENTS

| | | | |
|---|---|---|---|
| 3,565,791 A | 2/1971 | Urquhart et al. |
| 3,642,021 A | 2/1972 | Muller et al. |
| 3,685,541 A | 8/1972 | Caparone et al. |
| 3,695,903 A | 10/1972 | Telkes et al. |
| 3,721,386 A | 3/1973 | Brick et al. |
| 3,750,701 A | 8/1973 | Botnick |
| 3,952,796 A | 4/1976 | Larson |
| 4,051,869 A | 10/1977 | Holt et al. |
| 4,102,354 A | 7/1978 | Natale |
| 4,121,761 A | 10/1978 | Nolden |
| 4,150,817 A | 4/1979 | Regelin et al. |
| 4,166,575 A | 9/1979 | Sassi |
| 4,170,245 A | 10/1979 | Haley |
| 4,181,252 A | 1/1980 | Nolden |
| 4,185,771 A | 1/1980 | Killias |
| 4,189,792 A | 2/1980 | Veach |
| 4,222,410 A | 9/1980 | Geimer |
| 4,227,548 A | 10/1980 | Botnick |
| 4,241,868 A | 12/1980 | Perkins |
| 4,258,751 A | 3/1981 | Humpert |
| 4,270,570 A | 6/1981 | Kolze |
| 4,322,031 A | 3/1982 | Gehlert |
| 4,330,081 A | 5/1982 | McMillan |
| 4,359,186 A | 11/1982 | Kiendl |
| 4,399,836 A | 8/1983 | de Versterre et al. |
| 4,402,455 A | 9/1983 | Kolt |
| 4,406,398 A | 9/1983 | Perkins |
| 4,409,694 A | 10/1983 | Barrett, Sr. et al. |
| 4,420,811 A | 12/1983 | Tarnay et al. |
| 4,421,269 A | 12/1983 | Ts'ao |
| 4,429,422 A | 2/1984 | Wareham |
| 4,444,357 A | 4/1984 | Lynch et al. |
| 4,455,475 A | 6/1984 | Giorgetti |
| 4,478,249 A | 10/1984 | Fleischmann |
| 4,503,575 A | 3/1985 | Knoop et al. |
| 4,524,906 A | 6/1985 | Kenyon et al. |

(Continued)

FOREIGN PATENT DOCUMENTS

DE 3407796 A1 9/1985

(Continued)

*Primary Examiner*—Marc E Norman
(74) *Attorney, Agent, or Firm*—Baker & Daniels LLP

(57) ABSTRACT

A valve system including a manual control mechanism configured to move a valve member.

18 Claims, 11 Drawing Sheets

U.S. PATENT DOCUMENTS

| | | |
|---|---|---|
| 4,528,709 A | 7/1985 | Getz et al. |
| 4,558,817 A | 12/1985 | Kiendl |
| 4,560,284 A | 12/1985 | Chen |
| 4,563,780 A | 1/1986 | Pollack |
| 4,570,848 A | 2/1986 | McLellan |
| 4,572,238 A | 2/1986 | Stenlund |
| 4,575,262 A | 3/1986 | Andersen |
| 4,580,544 A | 4/1986 | Walker |
| 4,581,707 A | 4/1986 | Millar |
| 4,604,764 A | 8/1986 | Enzo |
| 4,618,091 A | 10/1986 | Buzzi |
| 4,630,940 A | 12/1986 | Ostertag et al. |
| 4,635,844 A | 1/1987 | Barrett, Sr. et al. |
| 4,645,489 A | 2/1987 | Krumme et al. |
| 4,674,678 A | 6/1987 | Knebel et al. |
| 4,682,626 A | 7/1987 | Bergmann |
| 4,682,728 A | 7/1987 | Oudenhoven et al. |
| 4,688,277 A | 8/1987 | Kakinoki et al. |
| 4,693,415 A | 9/1987 | Sturm |
| 4,694,512 A | 9/1987 | Knebel et al. |
| 4,700,884 A | 10/1987 | Barrett et al. |
| 4,700,885 A | 10/1987 | Knebel |
| 4,706,703 A | 11/1987 | Takeuchi et al. |
| 4,709,728 A | 12/1987 | Ying-Chung |
| 4,711,392 A | 12/1987 | Kidouchi et al. |
| 4,735,357 A | 4/1988 | Gregory et al. |
| 4,739,923 A | 4/1988 | Tsutsui et al. |
| 4,740,089 A | 4/1988 | Fiorentini |
| 4,742,456 A | 5/1988 | Kamena |
| 4,756,030 A | 7/1988 | Juliver |
| 4,757,943 A | 7/1988 | Sperling et al. |
| 4,762,273 A | 8/1988 | Gregory et al. |
| 4,763,681 A | 8/1988 | Cuny et al. |
| 4,768,705 A | 9/1988 | Tsutsui et al. |
| 4,842,191 A | 6/1989 | Bergmann |
| 4,854,498 A | 8/1989 | Stayton |
| 4,854,499 A | 8/1989 | Neuman |
| 4,863,098 A | 9/1989 | Kolze et al. |
| 4,867,375 A | 9/1989 | Ueki et al. |
| 4,869,287 A | 9/1989 | Pepper et al. |
| 4,869,427 A | 9/1989 | Kawamoto et al. |
| 4,870,986 A | 10/1989 | Barrett et al. |
| 4,873,830 A | 10/1989 | Blattler |
| 4,875,623 A | 10/1989 | Garris |
| 4,886,207 A | 12/1989 | Lee et al. |
| 4,896,101 A | 1/1990 | Cobb |
| 4,896,658 A | 1/1990 | Yonekubo et al. |
| 4,901,915 A | 2/1990 | Sakakibara |
| 4,909,435 A | 3/1990 | Kidouchi et al. |
| 4,921,162 A | 5/1990 | Blattler |
| 4,923,116 A | 5/1990 | Homan |
| 4,924,900 A | 5/1990 | Taube, Sr. et al. |
| 4,926,897 A | 5/1990 | Perrot |
| 4,928,732 A | 5/1990 | Hu |
| 4,931,938 A | 6/1990 | Hass |
| 4,936,347 A | 6/1990 | Oracz et al. |
| 4,941,608 A | 7/1990 | Shimizu et al. |
| 4,942,739 A | 7/1990 | Uda et al. |
| 4,945,943 A | 8/1990 | Cogger |
| 4,953,236 A | 9/1990 | Lee et al. |
| 4,955,535 A | 9/1990 | Tsutsui et al. |
| 4,965,894 A | 10/1990 | Baus |
| 4,967,794 A | 11/1990 | Tsutsui et al. |
| 4,968,152 A | 11/1990 | Bergmann |
| 4,969,576 A | 11/1990 | Merrill et al. |
| 4,969,598 A | 11/1990 | Garrs |
| 4,971,106 A | 11/1990 | Tsutsui et al. |
| 4,974,636 A | 12/1990 | Cogger |
| 4,976,460 A | 12/1990 | Newcombe et al. |
| 4,978,058 A | 12/1990 | Duncan et al. |
| 4,984,314 A | 1/1991 | Weigert |
| 4,986,470 A | 1/1991 | Yamazaki |
| 4,994,792 A | 2/1991 | Ziegler, Jr. |
| 5,032,992 A | 7/1991 | Bergmann |
| 5,033,671 A | 7/1991 | Shiba et al. |
| 5,038,420 A | 8/1991 | Chen |
| 5,050,062 A | 9/1991 | Hass |
| 5,050,641 A | 9/1991 | Shwu-Fen |
| 5,058,389 A | 10/1991 | Yasuda et al. |
| 5,058,624 A | 10/1991 | Kolze |
| 5,058,804 A | 10/1991 | Yonekubo et al. |
| 5,067,333 A | 11/1991 | Duncan et al. |
| 5,074,520 A | 12/1991 | Lee et al. |
| 5,085,399 A | 2/1992 | Tsutsui et al. |
| 5,085,948 A | 2/1992 | Tsukamoto et al. |
| 5,092,560 A | 3/1992 | Chen |
| 5,095,945 A | 3/1992 | Jensen |
| 5,109,347 A | 4/1992 | Quick, Jr. et al. |
| 5,111,969 A | 5/1992 | Knepler |
| 5,123,593 A | 6/1992 | Rundle |
| 5,125,433 A | 6/1992 | DeMoss et al. |
| 5,139,044 A | 8/1992 | Otten et al. |
| 5,148,824 A | 9/1992 | Wilson et al. |
| 5,170,361 A | 12/1992 | Reed |
| 5,170,514 A | 12/1992 | Weigert |
| 5,171,429 A | 12/1992 | Yasuo |
| 5,174,495 A | 12/1992 | Eichholz et al. |
| 5,184,642 A | 2/1993 | Powell |
| 5,197,508 A | 3/1993 | Gottling et al. |
| 5,199,790 A | 4/1993 | Pawelzik et al. |
| 5,206,963 A | 5/1993 | Wiens |
| 5,215,251 A | 6/1993 | Volk, Jr. et al. |
| 5,224,509 A | 7/1993 | Tanaka et al. |
| 5,240,028 A | 8/1993 | Hoch, Jr. et al. |
| 5,255,844 A | 10/1993 | Miller et al. |
| 5,261,597 A | 11/1993 | Perlman et al. |
| 5,273,208 A | 12/1993 | Herrick |
| 5,287,570 A | 2/1994 | Peterson et al. |
| 5,294,045 A | 3/1994 | Harris |
| 5,294,051 A | 3/1994 | Piegari |
| 5,295,274 A | 3/1994 | Daniels et al. |
| 5,299,775 A | 4/1994 | Kolze |
| 5,303,731 A | 4/1994 | Vavra et al. |
| 5,322,086 A | 6/1994 | Sullivan |
| 5,329,949 A | 7/1994 | Moncourtois et al. |
| 5,339,859 A | 8/1994 | Bowman |
| 5,348,223 A | 9/1994 | Sonesson et al. |
| 5,350,112 A | 9/1994 | Stein |
| 5,358,177 A | 10/1994 | Cashmore |
| 5,358,213 A | 10/1994 | Pilolla |
| 5,361,215 A | 11/1994 | Tompkins et al. |
| 5,364,364 A * | 11/1994 | Kasvikis et al. ............. 604/151 |
| 5,397,099 A | 3/1995 | Pilolla |
| 5,400,961 A | 3/1995 | Tsutsui et al. |
| 5,417,404 A | 5/1995 | Varden |
| 5,428,850 A | 7/1995 | Hiraishi et al. |
| RE35,018 E | 8/1995 | Homan |
| 5,452,740 A | 9/1995 | Bowman |
| 5,459,890 A | 10/1995 | Jarocki |
| 5,462,224 A | 10/1995 | Enoki et al. |
| 5,494,077 A | 2/1996 | Enoki et al. |
| 5,504,950 A | 4/1996 | Natalizia et al. |
| 5,506,391 A | 4/1996 | Burayez et al. |
| 5,511,723 A | 4/1996 | Eki et al. |
| 5,518,311 A | 5/1996 | Althaus et al. |
| 5,550,753 A | 8/1996 | Tompkins et al. |
| 5,551,630 A | 9/1996 | Enoki et al. |
| 5,564,462 A | 10/1996 | Storch |
| 5,577,660 A | 11/1996 | Hansen |
| 5,588,636 A | 12/1996 | Eichholz et al. |
| 5,598,973 A | 2/1997 | Weston |
| 5,694,653 A | 12/1997 | Harald |
| 5,755,262 A | 5/1998 | Pilolla |
| 5,779,139 A | 7/1998 | Ueno |

| | | |
|---|---|---|
| 5,810,474 A | 9/1998 | Hidalgo |
| 5,829,072 A | 11/1998 | Hirsch et al. |
| 5,845,844 A | 12/1998 | Zosimodis |
| 5,855,356 A | 1/1999 | Fait |
| 5,860,596 A | 1/1999 | Kolt |
| 5,868,311 A | 2/1999 | Cretu-Petra |
| 5,873,518 A | 2/1999 | Richmond et al. |
| 5,889,684 A | 3/1999 | Ben-David et al. |
| 5,904,292 A | 5/1999 | McIntosh |
| 5,927,332 A | 7/1999 | Richard |
| 5,931,374 A | 8/1999 | Knapp |
| 5,941,635 A | 8/1999 | Stewart |
| 5,944,255 A | 8/1999 | Shirmohamadi |
| 5,966,753 A | 10/1999 | Gauthier et al. |
| 5,970,528 A | 10/1999 | Shirai et al. |
| 5,975,124 A | 11/1999 | Stevens, II |
| 5,979,775 A | 11/1999 | Raya |
| 5,979,776 A | 11/1999 | Williams |
| 6,003,182 A | 12/1999 | Song |
| 6,024,290 A | 2/2000 | Dosani et al. |
| 6,029,094 A | 2/2000 | Diffut |
| 6,044,857 A | 4/2000 | Stege |
| 6,050,296 A | 4/2000 | Hoffmann et al. |
| 6,056,201 A | 5/2000 | Ta |
| 6,059,192 A | 5/2000 | Zosimadis |
| 6,079,625 A | 6/2000 | Lebkuchner |
| 6,097,993 A | 8/2000 | Skupin et al. |
| 6,123,094 A | 9/2000 | Breda |
| 6,132,085 A | 10/2000 | Bergeron |
| 6,168,949 B1 | 1/2001 | Rubenberger |
| 6,195,588 B1 | 2/2001 | Gauthier et al. |
| 6,199,587 B1 | 3/2001 | Shlomi et al. |
| 6,219,859 B1 | 4/2001 | Derakhshan |
| 6,234,670 B1 | 5/2001 | Bergeron |
| 6,237,853 B1 | 5/2001 | Bergmann |
| 6,239,708 B1 | 5/2001 | Young |
| 6,241,379 B1 | 6/2001 | Larsen |
| 6,250,558 B1 | 6/2001 | Dogre Cuevas |
| 6,250,601 B1 | 6/2001 | Kolar et al. |
| 6,253,624 B1 | 7/2001 | Broden et al. |
| 6,264,121 B1 | 7/2001 | McClary |
| 6,270,014 B1 | 8/2001 | Bollas et al. |
| 6,273,394 B1 | 8/2001 | Vincent et al. |
| 6,279,777 B1 | 8/2001 | Goodin |
| 6,286,464 B1 | 9/2001 | Abraham et al. |
| 6,286,764 B1 | 9/2001 | Garvey et al. |
| 6,290,139 B1 | 9/2001 | Kolze |
| 6,294,786 B1 | 9/2001 | Marcichow et al. |
| 6,305,610 B1 | 10/2001 | Estes |
| 6,305,663 B1 | 10/2001 | Miller |
| 6,315,208 B1 | 11/2001 | Doyle |
| 6,317,717 B1 | 11/2001 | Lindsey et al. |
| 6,321,785 B1 | 11/2001 | Bergmann |
| 6,336,233 B1 | 1/2002 | Shaw et al. |
| 6,340,032 B1 | 1/2002 | Zosimadis |
| 6,341,389 B2 | 1/2002 | Philipps-Liebich et al. |
| 6,341,731 B1 | 1/2002 | Knapp |
| 6,352,106 B1 | 3/2002 | Hartman |
| 6,363,549 B2 | 4/2002 | Humpert |
| 6,378,545 B1 | 4/2002 | Bozkan et al. |
| 6,382,252 B1 | 5/2002 | Moore et al. |
| 6,390,125 B2 | 5/2002 | Pawelzik et al. |
| 6,394,361 B1 | 5/2002 | Fridmann et al. |
| 6,405,932 B1 | 6/2002 | Palmer |
| 6,408,881 B2 | 6/2002 | Lorenzelli et al. |
| 6,435,213 B2 | 8/2002 | Lou |
| 6,438,770 B1 | 8/2002 | Hed et al. |
| 6,445,880 B1 | 9/2002 | Hollander et al. |
| 6,446,875 B1 | 9/2002 | Brooks et al. |
| RE37,888 E | 10/2002 | Cretu-Petra |
| 6,463,999 B1 | 10/2002 | Jung |
| 6,464,210 B1 | 10/2002 | Teran et al. |
| 6,473,917 B1 | 11/2002 | Mateina |
| 6,478,285 B1 | 11/2002 | Bergmann |
| 6,481,029 B1 | 11/2002 | Mateina |
| 6,497,372 B2 | 12/2002 | Lee et al. |
| 6,513,787 B1 | 2/2003 | Jeromson et al. |
| 6,517,006 B1 | 2/2003 | Knapp |
| 6,549,816 B2 | 4/2003 | Gauthier et al. |
| 6,554,196 B2 | 4/2003 | Sasayama et al. |
| 6,557,785 B1 | 5/2003 | Knapp |
| 6,601,986 B2 | 8/2003 | Jang et al. |
| 6,619,320 B2 | 9/2003 | Parsons |
| 6,629,645 B2 | 10/2003 | Mountford et al. |
| 6,637,668 B2 | 10/2003 | Eveleigh |
| 6,641,727 B1 | 11/2003 | Aldred et al. |
| 6,655,829 B1 | 12/2003 | Vanden Bussche et al. |
| 6,659,361 B2 | 12/2003 | Sasayama et al. |
| 6,669,843 B2 | 12/2003 | Arnaud |
| 6,676,024 B1 | 1/2004 | McNerney et al. |
| 6,679,476 B2 | 1/2004 | Noyes et al. |
| 6,691,338 B2 | 2/2004 | Zieger |
| 6,701,194 B2 | 3/2004 | Gauthier et al. |
| 6,705,534 B1 | 3/2004 | Mueller |
| 6,708,895 B1 | 3/2004 | Knapp |
| 6,713,036 B1 | 3/2004 | Vanden Bussche et al. |
| 6,715,731 B1 | 4/2004 | Post et al. |
| 6,722,575 B1 | 4/2004 | Gagne et al. |
| 6,769,252 B2 | 8/2004 | Smith |
| 6,776,395 B1 | 8/2004 | Meier |
| 6,805,330 B2 | 10/2004 | Bush |
| 6,811,713 B2 | 11/2004 | Arnaud |
| 6,820,816 B1 | 11/2004 | Reid |
| 6,823,892 B1 | 11/2004 | Knapp |
| 6,826,455 B1 | 11/2004 | Iott et al. |
| 6,854,658 B1 | 2/2005 | Houghton et al. |
| 6,874,535 B2 | 4/2005 | Parsons et al. |
| 6,883,541 B2 | 4/2005 | Hwang |
| 6,962,168 B2 | 11/2005 | McDaniel et al. |
| 2001/0020645 A1 | 9/2001 | Mountford et al. |
| 2001/0044954 A1 | 11/2001 | DiCarlo |
| 2002/0020179 A1 | 2/2002 | Winkler |
| 2002/0029416 A1 | 3/2002 | Shaw et al. |
| 2002/0148040 A1 | 10/2002 | Mateina |
| 2002/0179723 A1 | 12/2002 | Wack et al. |
| 2003/0052007 A1 | 3/2003 | Paul et al. |
| 2003/0080194 A1 | 5/2003 | O'Hara et al. |
| 2003/0088338 A1 | 5/2003 | Phillips et al. |
| 2003/0125842 A1 | 7/2003 | Chang et al. |
| 2003/0126993 A1 | 7/2003 | Lassota et al. |
| 2003/0218074 A1 | 11/2003 | Beck et al. |
| 2004/0000594 A1 | 1/2004 | Beck et al. |
| 2004/0041033 A1 | 3/2004 | Kemp |
| 2004/0041034 A1 | 3/2004 | Kemp |
| 2004/0134545 A1 | 7/2004 | Ford |
| 2004/0193326 A1 | 9/2004 | Phillips et al. |
| 2006/0231636 A1 | 10/2006 | Schmitt |
| 2006/0231637 A1 | 10/2006 | Schmitt |
| 2006/0231638 A1 | 10/2006 | Belz et al. |

FOREIGN PATENT DOCUMENTS

| | | |
|---|---|---|
| DE | 3430 176 A1 | 3/1998 |
| GB | 2 143 343 | 2/1985 |
| JP | 3-235103 | 10/1991 |
| JP | 8-311967 | 11/1996 |

* cited by examiner

MANUAL OVERRIDE FOR ELECTRONIC PROPORTIONING VALVE

BACKGROUND AND SUMMARY OF THE INVENTION

The present invention relates to a fluid delivery system and, more particularly, to an electronic proportioning valve system which controls the flow of water by operation of an actuator and which can also be operated through manual control during failure of the actuator or interruption of power thereto.

Conventional automatic water control devices as used in domestic applications generally rely on an electric actuator to continuously operate a valve. Failure of the electric actuator, and/or interruption of the electric power supply, disables the operator's ability to control the water flow. This failure may be a minor inconvenience to the operator if it occurs when the water control device is turned off and no water is flowing. However, such a failure may be a major concern to the operator if it occurs when the water control device is turned on and water is flowing with no way to conveniently control the water flow. More particularly, an operator may be in a position where he or she may not conveniently turn off the water flow should the electric actuator fail or the power supply thereto be interrupted.

According to an illustrative embodiment of the present invention, a proportioning valve system is provided for connection to a cold water source, a hot water source, and a mixed water outlet, and for delivering a mixed water of a desired temperature to the mixed water outlet. The proportioning valve system includes a cold water valve configured to be in fluid communication with the cold water source for receiving cold water. The cold water valve includes a movable cold water valve member configured to control the flow of cold water therethrough. A cold water actuator is coupled to the cold water valve and is configured to move the cold water valve member. A cold water manual control mechanism is coupled to the cold water valve and is configured to manually move the cold water valve member. A cold water sensor is positioned to measure at least one characteristic of the cold water. A hot water valve is configured to be in fluid communication with the hot water source for receiving hot water. The hot water valve includes a movable hot water valve member configured to control the flow of hot water therethrough. A hot water actuator is coupled to the hot water valve and is configured to move the hot water valve member. A hot water manual control mechanism is coupled to the hot water valve and is configured to manually move the hot water valve member. A hot water sensor is positioned to measure at least one characteristic of the hot water. A controller is operably coupled to the cold water actuator, the hot water actuator, the cold water sensor, and the hot water sensor. The controller is configured to cause the cold water actuator to move the cold water valve member and the hot water actuator to move the hot water valve member to regulate a mixed water temperature of the mixed water. The controller is further configured to operate in at least a feed forward manner providing for movement of the cold water valve member and the hot water valve member based on the at least one characteristic of the hot water and the at least one characteristic of the cold water.

According to a further illustrative embodiment of the present invention, a proportioning valve system is provided for connection to a cold water source, a hot water source, and a mixed water outlet. The proportioning valve system includes a cold water valve configured to be in fluid communication with the cold water source for receiving cold water. The cold water valve includes a movable cold water valve member configured to control the flow of cold water therethrough. A cold water actuator includes a drive shaft having a rotational axis, the drive shaft being operably coupled to the cold water valve for moving the cold water valve member. A cold water manual control mechanism includes a control shaft having a rotational axis, the control shaft being operably coupled to the cold water valve for manually moving the cold water valve member. The rotational axis of the drive shaft of the cold water actuator is disposed substantially perpendicular to the rotational axis of the control shaft of the cold water manual control mechanism. A hot water valve is configured to be in fluid communication with the hot water source for receiving hot water. The hot water valve includes a movable hot water valve member configured to control the flow of hot water therethrough. A hot water actuator includes a drive shaft having a rotational axis, the drive shaft being operably coupled to the hot water valve for moving the hot water valve member. A hot water manual control mechanism includes a control shaft having a rotational axis, the control shaft being operably coupled to the hot water valve for manually moving the hot water valve member. The rotational axis of the drive shaft of the hot water actuator is disposed substantially perpendicular to the rotational axis of the control shaft of the hot water manual control mechanism.

According to a further illustrative embodiment of the present invention, a proportioning valve system is provided for connection to a cold water source, a hot water source, and a mixed water outlet. The proportioning valve system includes a cold water valve configured to be in fluid communication with the cold water source for receiving cold water. The cold water valve includes a movable cold water valve member configured to control the flow of cold water therethrough. A cold water actuator includes a drive shaft having a rotational axis, the drive shaft being operably coupled to the cold water valve for moving the cold water valve member. A cold water control handle is coupled to a cold water manual control shaft having a rotational axis. A cold water gear assembly operably couples the cold water manual control shaft to the drive shaft of the cold water actuator for manually moving the cold water valve member. A hot water valve is configured to be in fluid communication with the hot water source for receiving hot water. The hot water valve includes a movable hot water valve member configured to control the flow of hot water therethrough. A hot water actuator includes a drive shaft having a rotational axis, the drive shaft being operably coupled to the hot water valve for moving the hot water valve member. A hot water control handle is coupled to a hot water manual control shaft having a rotational axis. A hot water gear assembly operably couples the hot water manual control shaft to the drive shaft of the hot water actuator for manually moving the hot water valve member.

According to another illustrative embodiment of the present invention, a valve assembly is configured to be positioned within a wall including an access opening. The valve assembly includes a valve configured to be coupled to a water source, the valve including a movable valve member configured to control the flow of water therethrough. An actuator is operably coupled to the valve and is configured to move the valve member. A cover is configured to be supported by the wall to conceal the access opening. A sensor is configured to detect the position of the cover relative to the access opening. A controller is in communication with the sensor and is configured to control operation of the actuator in response to the position of the cover as detected by the sensor.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
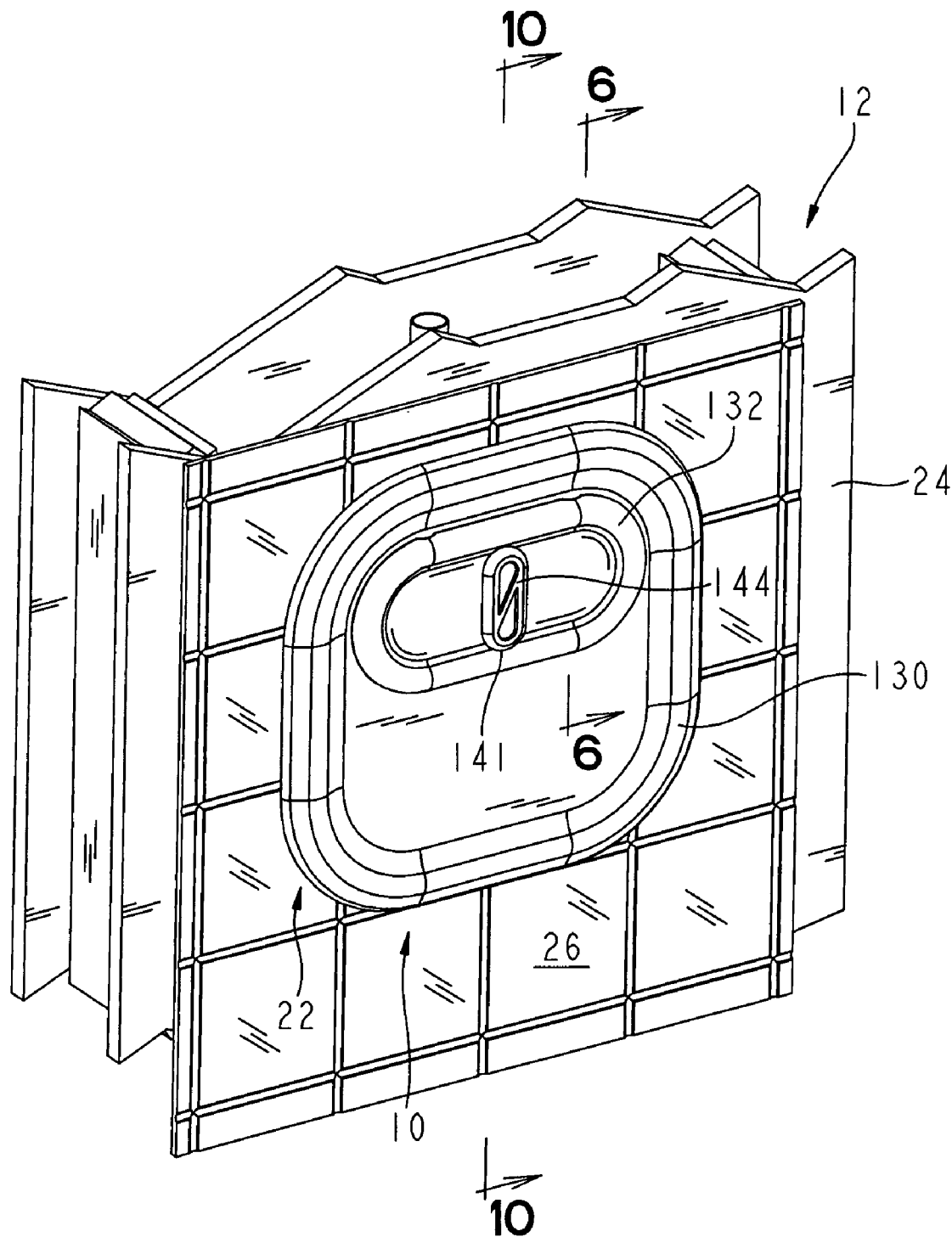
FIG. 1 is a perspective view of an illustrative embodiment proportioning valve system including an escutcheon assembly supported within a wall.
Figure 2:
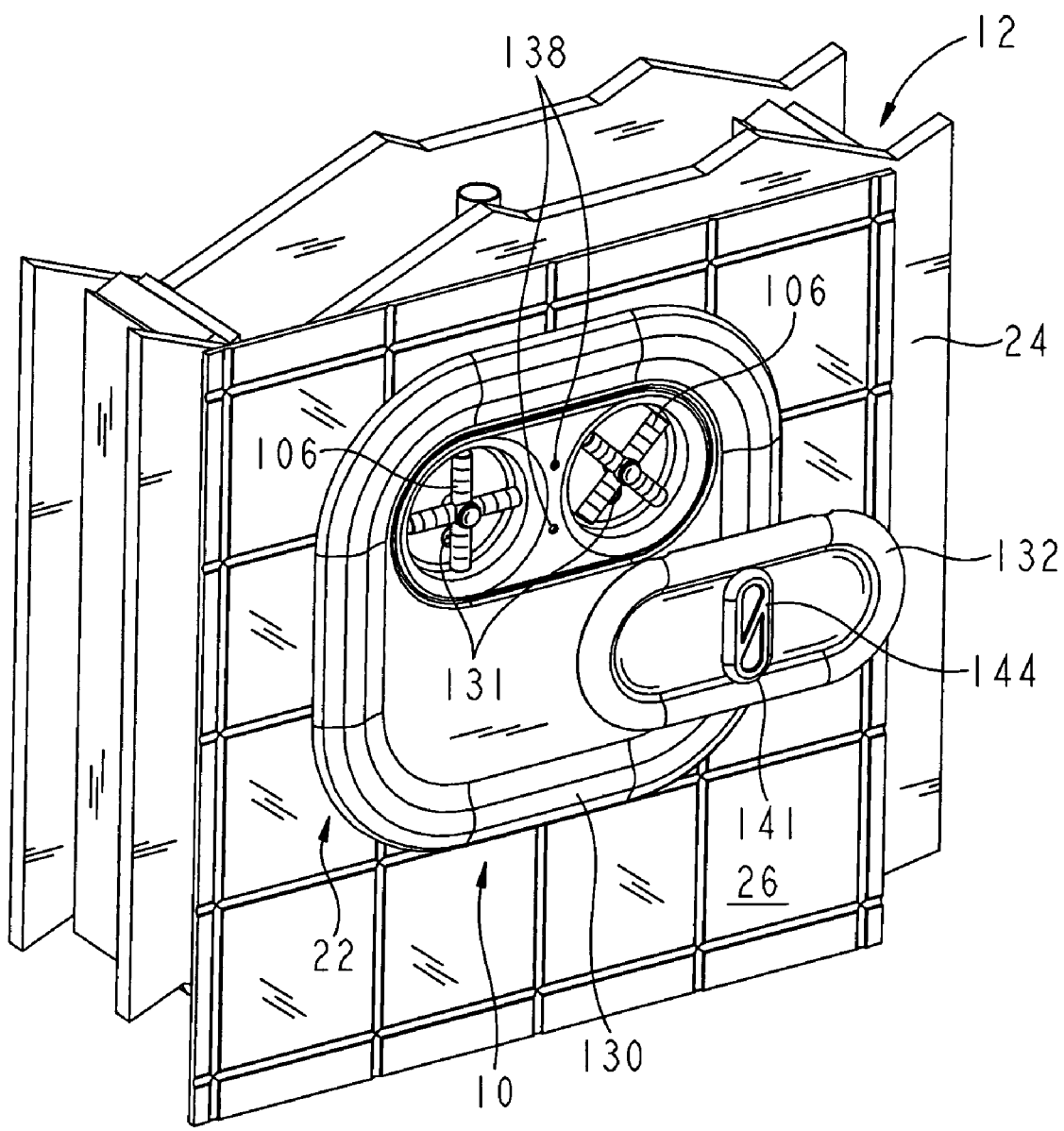
FIG. 2 is a perspective view of the valve system of FIG. 1, showing the access cover removed to reveal manual control handles.
Figure 3:
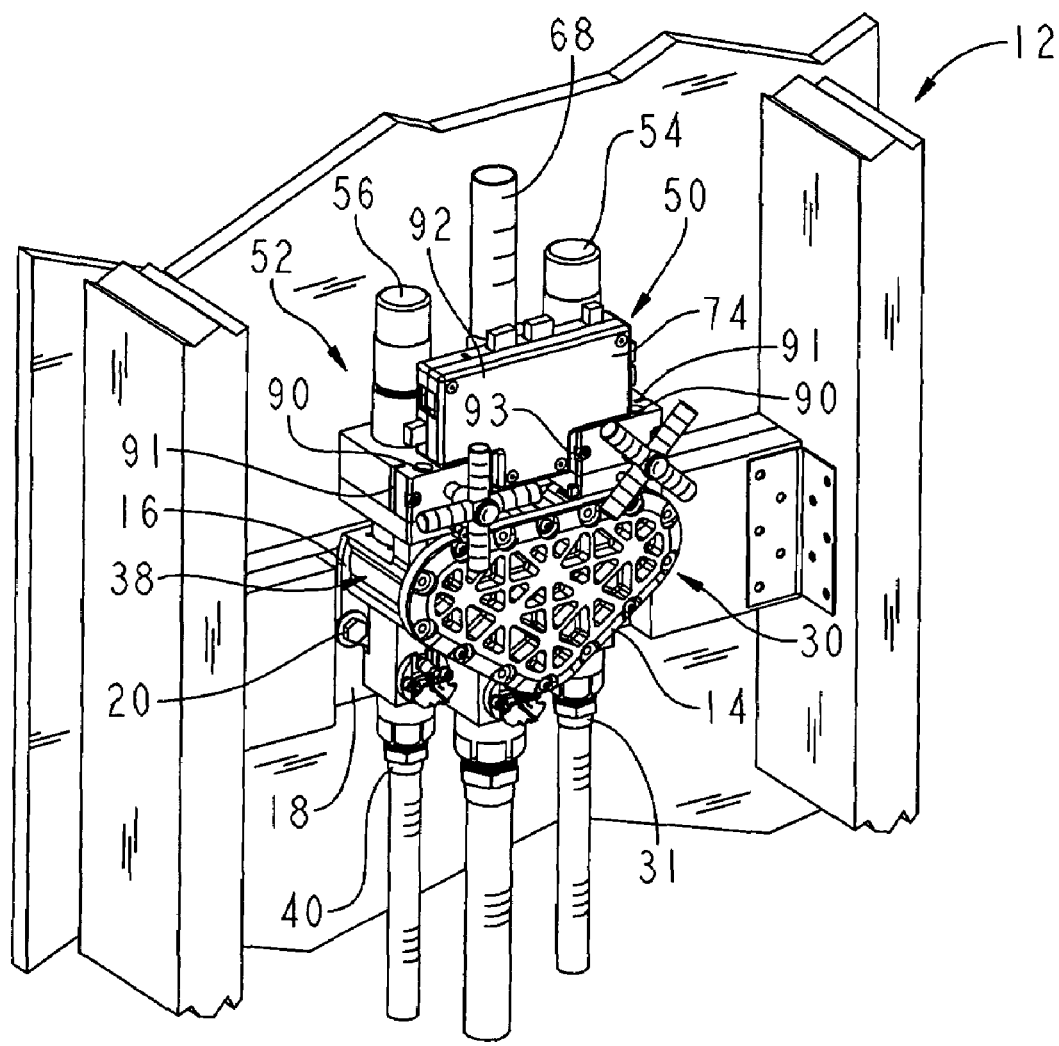
FIG. 3 is a perspective view of the valve system of FIG. 1, with the escutcheon assembly and the outer layer of the wall removed.

Referring initially to FIGS. 1-4, the proportioning valve system 10 of the illustrative embodiment is configured to be supported within a conventional wall 12. More particularly, the valve system 10 illustratively includes a fluid mixer 14 having a bracket 16 configured to be secured to a support or stringer 18, typically a wood stud of the wall 12, through a conventional fastener, such as a bolt 20 (FIG. 3). An escutcheon assembly 22 is secured to the outer portion or layer 24 of the wall 12 and is configured to conceal the components of the valve system 10 positioned behind an outer surface 26 of the wall 12.

Figure 4:
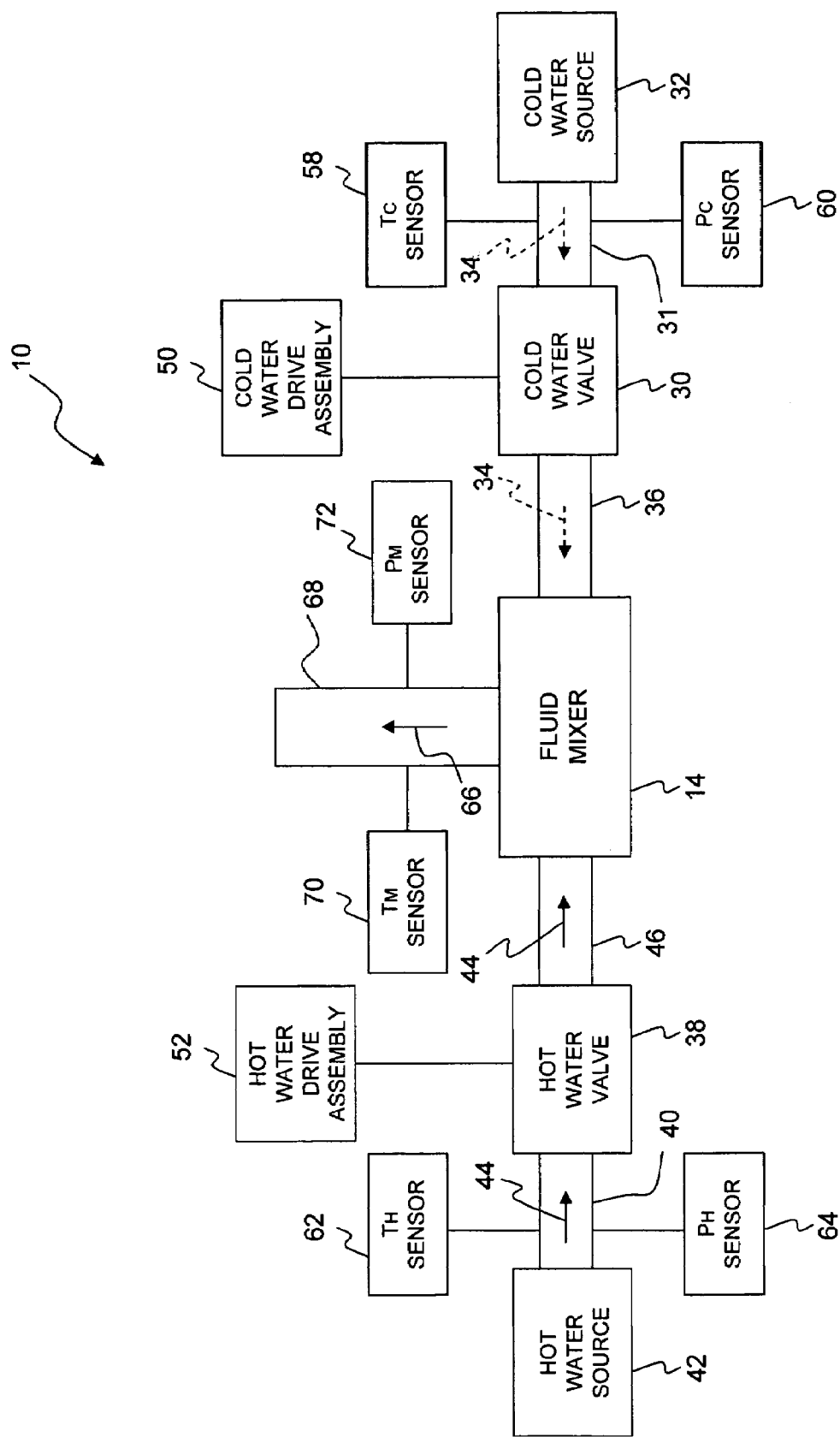
FIG. 4 is a block diagram of the valve system of FIG. 1.

With reference to FIGS. 3 and 4, the valve system 10 illustratively includes a cold water valve 30 having an inlet 31 configured to be coupled to a cold water source 32 for receiving cold water 34. An outlet 36 of the cold water valve 30 is in fluid communication with the fluid mixer 14. Similarly, a hot water valve 38 has an inlet 40 configured to be coupled to a hot water source 42 for receiving hot water 44. An outlet 46 of the hot water valve 38 is in fluid communication with the fluid mixer 14.

Both the cold water valve 30 and the hot water valve 38 may be of conventional design and illustratively include a rotatable valving member 48 (FIG. 8), received within the fluid mixer 14 wherein rotation of the valving member 48 increases or decreases the rate of water flow through the respective valve 30, 38. Illustratively, the valving members 48 are of a low torque ceramic disk variety that require reduced energy to operate and are field replaceable. In the illustrative embodiment, the cold water valve 30 and the hot water valve 38 each comprise Model No. F120 available from Fluehs Corporation of Germany. It should be appreciated that other suitable valves may be readily substituted therefor.

With further reference to FIGS. 3 and 4, a cold water drive assembly 50 is operably coupled to the cold water valve 30, and a hot water drive assembly 52 is operably coupled to the hot water valve 38. Each assembly 50, 52 includes an actuator 54,56 operably coupled to the respective valving member 48.

Operation of the cold water actuator 54 adjusts the flow of the cold water 34 through the cold water valve 30, and operation of the hot water actuator 56 adjusts the flow of the hot water 44 through the hot water valve 38. Both the cold water actuator 54 and the hot water actuator 56 may comprise a conventional direct current (DC) electric motor, such as Model No. SG-30-02, available from Telco Intercontinental Corp. of Houston, Tex. Another illustrative embodiment DC electric motor comprises Model No. SR-007, available from Sanyo of Bensenville, Ill. It should be appreciated that other conventional actuators, such as servo motors may also be used to drive the valving members 48.

In a further illustrative embodiment, each direct current (DC) motor 54 and 56 may be provided with feedback control. More particularly, an encoder, such as a Hall-effect device (not shown), or any other device or circuit that produces a wave form in response to motor operation, may be operably coupled to each DC motor 54 and 56. As known in the art, a Hall-effect device changes state based on magnetic field. In the further illustrative embodiment, a magnetic disk with alternating poles is supported for rotation with each valving member 48 and is positioned proximate the Hall-effect device. When the motor 54, 56 turns the valving member 48, the output of the Hall-effect is a square wave. The position of each valving member 48 may be determined by counting wave pulses.

In the illustrative embodiment of FIG. 4, a cold water temperature sensor 58 is operably coupled to the inlet 31 of the cold water valve 30 and is configured to measure a temperature ($T_C$) of the cold water 34 flowing therethrough. Similarly, a cold water pressure sensor 60 is operably coupled to the inlet 31 of the cold water valve 30 and is configured to measure a pressure ($P_C$) of the cold water 34 therein. A hot water temperature sensor 62 is operably coupled to the inlet 40 of the hot water valve 38 and is configured to measure a temperature ($T_H$) of the hot water 44 flowing into the hot water valve 38. Similarly, a hot water pressure sensor 64 is operably coupled to the inlet 40 of the hot water valve 38 and is configured to measure a pressure ($P_H$) of the hot water 44 contained therein.

The fluid mixer 14 receives the cold water 34 from the outlet 36 of the cold water valve 30 and the hot water 44 from the outlet 46 of the hot water valve 38, and forms a combined mixed water 66 which is then discharged through a mixed water outlet 68. A mixed water temperature sensor 70 is operably coupled to the mixed water outlet 68 and is configured to measure the temperature ($T_M$) of the mixed water 66 flowing therethrough. A mixed water pressure sensor 72 is operably coupled to the mixed water outlet 68 and is configured to measure the pressure ($P_M$) of the mixed water 66 contained therein.

Figure 5:
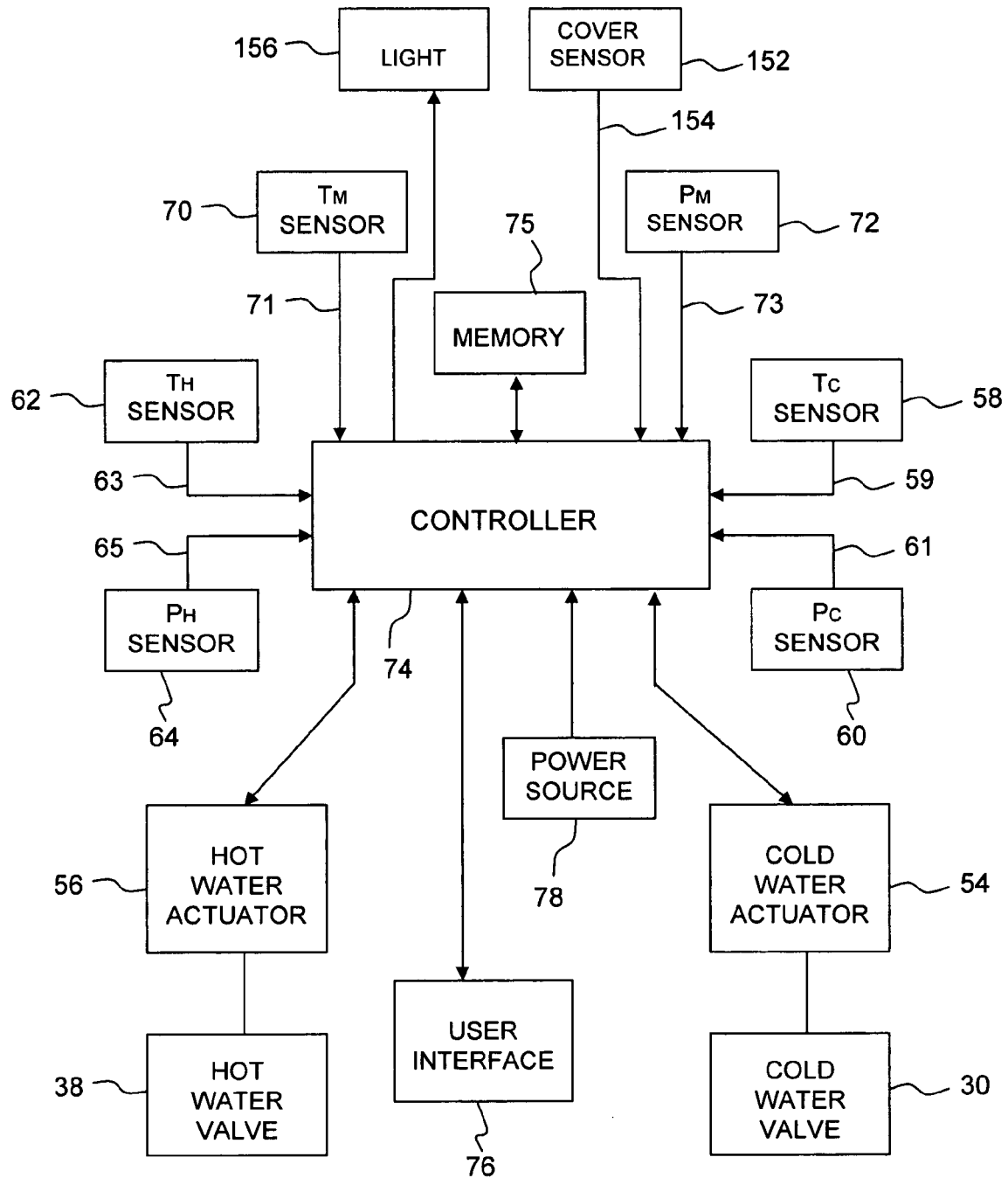
FIG. 5 is a block diagram illustrating communication links between various control components of the valve system of FIG. 1.

As shown in FIG. 5, the cold water temperature sensor 58, the cold water pressure sensor 60, the hot water temperature sensor 62, the hot water pressure sensor 64, the mixed water temperature sensor 70, and the mixed water pressure sensor 72 are all operably coupled to a controller 74. The controller 74 illustratively receives signals 59, 61, 63, 65, 71, and 73 from the sensors 58, 60, 62, 64, and 70, and 72, respectively, and in response thereto controls operation of the cold water actuator 54 to adjust the flow of the cold water 34 through the cold water valve 30 and controls operation of the hot water actuator 56 to adjust the flow of the hot water 44 through the hot water valve 38. A conventional memory 75 is operably coupled to the controller 74. The memory 75 may be utilized to provide program instructions to the controller 74 and to store variables during operation of the valve system 10.

A user interface 76 is in communication with the controller 74 and is configured to receive input from a user. More particularly, the user interface 76 receives commands from the user which controls operation of the controller 74. The user interface 76 may comprise any suitable device including a control panel hard-wired to the controller 74 of the type including a display screen and a plurality of user activated buttons. Alternatively, the user interface 76 may communicate with the controller 74 through a wireless interface, such as radio frequency or infrared transmissions. In a further illustrative embodiment, the user interface 76 may include a voice recognition module such that the user may control operation of the controller 74 by providing verbal instructions. Further, the user interface 76 may be located at a variety of locations based upon user preference. For example, the user interface 76 may be positioned on a faucet head, at the side or front of a sink to facilitate access by handicapped users, or at the side or outside of a shower (not shown). A conventional communications bus may be utilized to facilitate communication between the controller 74 and the various components illustrated in FIG. 5.

A conventional power source 78 is coupled to the controller 74 and is configured to provide power to the electrical components of the system 10, including the cold water actuator 54, the hot water actuator 56, and the user interface 76. The power source 78 may include a backup battery which is rechargeable through a hydrogenerator (not shown). More particularly, the fluid mixer 14 may include a hydrogenerator for generating electrical current in response to water flow through the system 10. The hydrogenerator may perform battery charging and support power needs of the system 10.

An illustrative embodiment method of operation of the proportioning valve system 10 includes three major functional components or, routines stored in memory 75 and executed by the controller 74. These routines include a feed forward function or routine, a feed back function or routine, and a restriction compensation function or routine. Illustratively, the feed forward function is used to calculate theoretical positions of the valving members 48 of the cold water valve 30 and the hot water valve 38 if a large change to the system 10 occurs. In particular, any significant change in system inputs (e.g., $T_C$, $P_C$, $T_H$, $P_H$, or user input) will cause the controller to adjust the angular positions of the valving members 48 of the valves 30 and 38, thus maintaining the stability of the mixed water temperature ($T_M$). The feed forward function facilitates rapid adjustment of the valves 30 and 38 to obtain mixed water temperature ($T_M$) and flow rate ($Q_M$) within a predetermined range to the desired temperature and flow rate. The feedback function is invoked in order to achieve greater accuracy and precision, while the restriction compensation function is utilized to adjust for outlet restrictions.

Additional details of an illustrative embodiment control system for use in connection with the valve system 10 are detailed in U.S. patent application Ser. No. 11/109,281, filed Apr. 19, 2005, which is assigned to the assignee of the present invention and is expressly incorporated herein by reference. Likewise, additional details of the illustrative mixer 14 are disclosed in U.S. patent application Ser. No. 11/109,283, filed Apr. 19, 2005, which is assigned to the assignee of the present invention and is expressly incorporated herein by reference.

The cold water drive assembly 50 and the hot water drive assembly 52 are substantially identical. As such, while FIGS. 6-9 illustrate the cold water drive assembly 50, it should be appreciated that the hot water drive assembly 52 includes similar components.

Each actuator 54, 56 includes a rotatable drive shaft 80 which is operably coupled to a rotatable shaft 82 of the valving member 48. Both shafts 80 and 82 are configured to rotate about a longitudinal axis 81. Inline alignment of shafts 80 and 82 facilitates efficient use of space within the wall 12 and prevents bearing side load.

Figure 6:
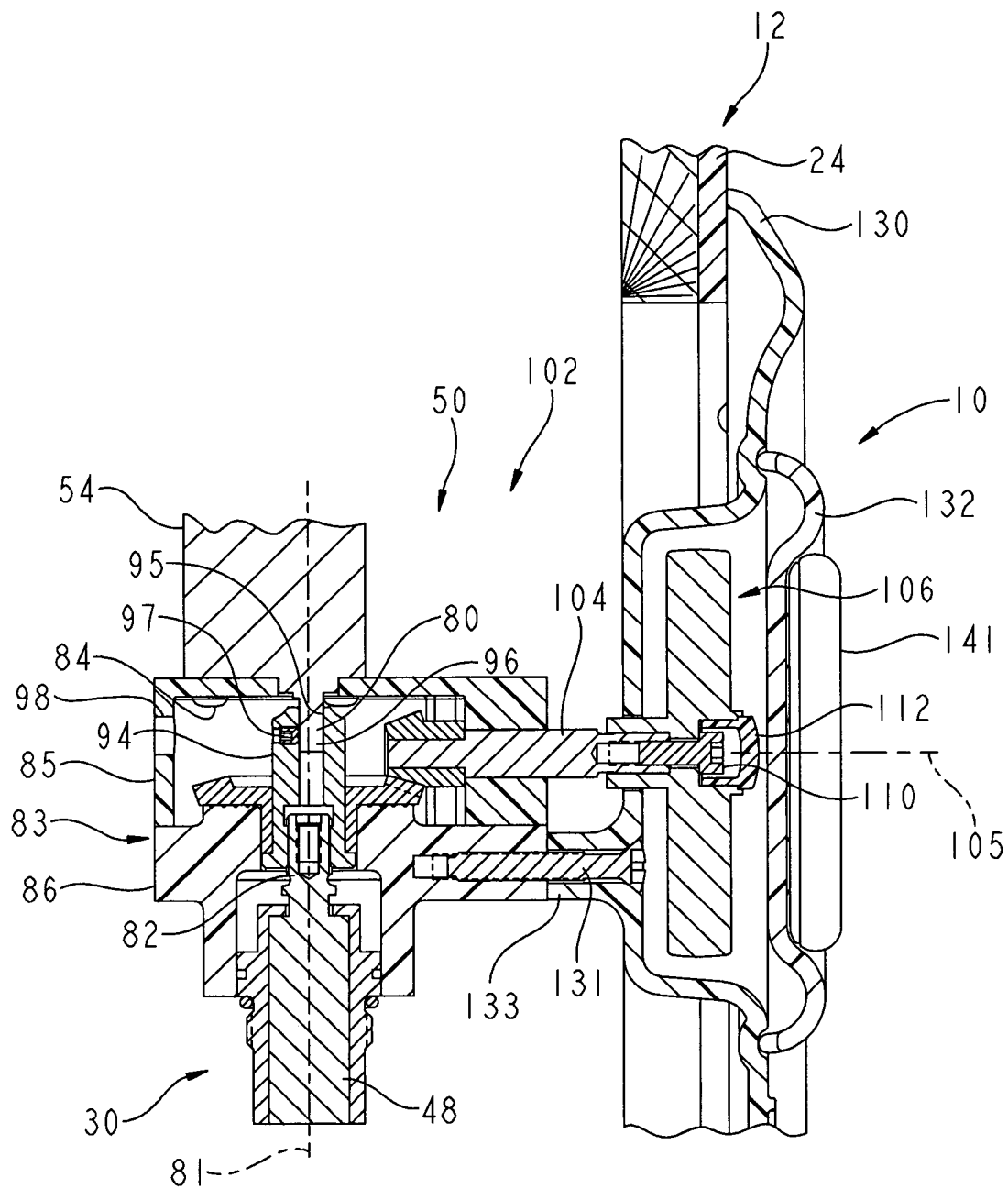
FIG. 6 is a cross-sectional view taken along line 6-6 of FIG. 1, with the fluid mixer removed for clarity.
Figure 7:
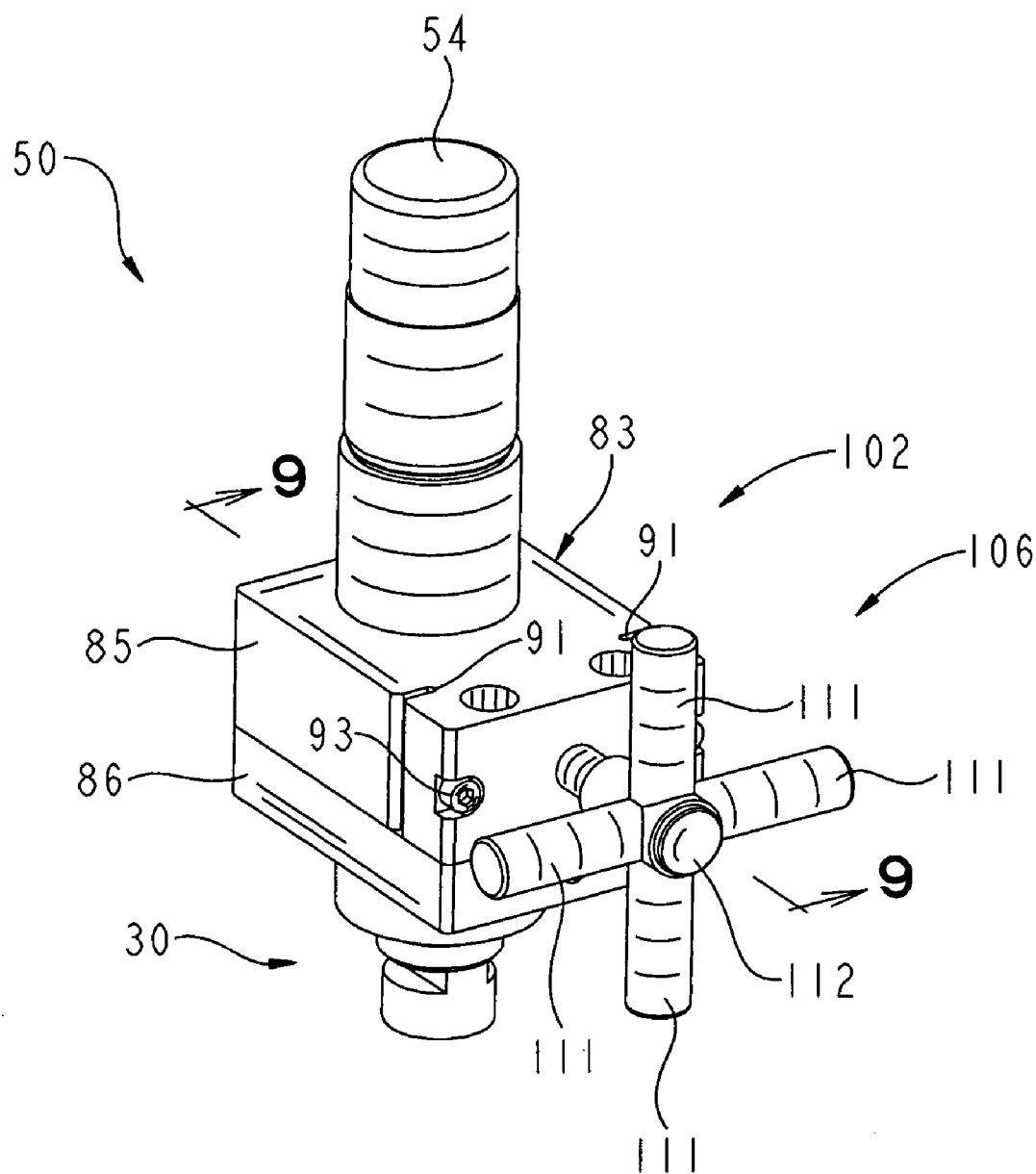
FIG. 7 is a perspective view of a drive assembly and valving member of the valve system of FIG. 1.
Figure 8:
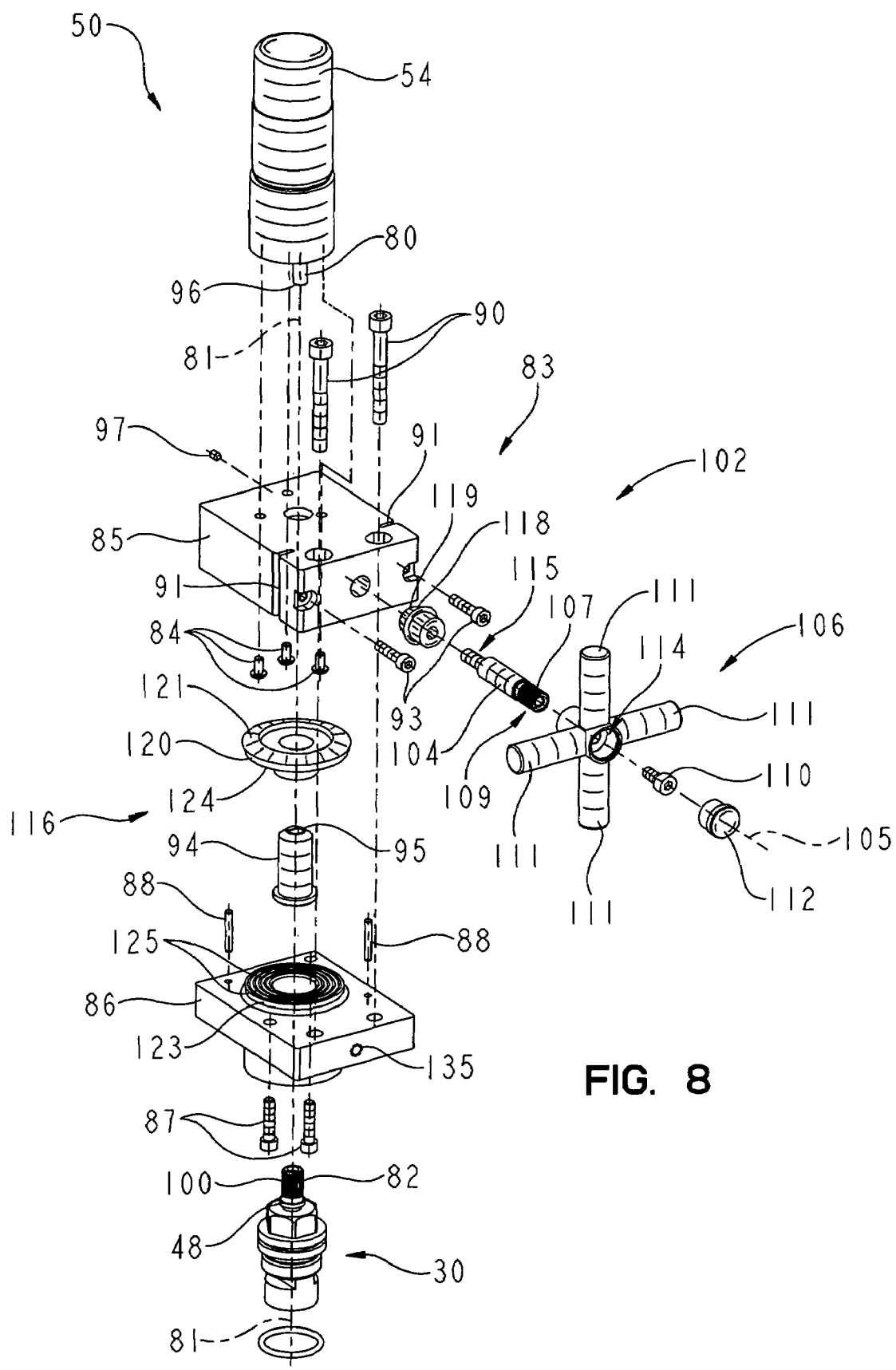
FIG. 8 is an exploded perspective view of the drive assembly and valving member of FIG. 7.

As shown in FIGS. 6 and 8, the actuator 54, 56 is coupled to a housing 83 through a plurality of conventional fasteners, such as screws 84. The housing 83 includes an upper mounting member 85 which is coupled to a lower mounting member 86 through conventional fasteners, such as bolts 87. Pins 88 are utilized to assist in orienting the upper mounting member 85 relative to the lower mounting member 86. The housing 83 is coupled to the fluid mixer 14 through conventional fasteners, such as bolts 90 (FIGS. 3 and 8).

With further reference to FIGS. 3 and 8, a pair of slots 91 are illustratively formed in the upper mounting member 85 of each drive assembly 50 and 52. The controller 74 includes a housing 92 having a pair of flanges or ears (not shown) that are received within the slots 91 and secured therein by conventional fasteners, such as bolts 93.

A coupling sleeve 94 couples the drive shaft 80 of the actuator 54, 56 to the shaft 82 of the valving member 48. Illustratively, the upper portion of the sleeve 94 has a receiving bore 95 with a D-shaped cross section to receive a complementary D-shaped cross-sectional portion 96 of the drive shaft 80. A set screw 97 is configured to assist in rotationally securing the drive shaft 80 relative to the sleeve 94 along rotational axis 81. An opening 98 (FIG. 6) is formed within the upper mounting member 85 which provides access to the screw 97 by a tool, such as a wrench (not shown). Illustratively, the drive shaft 80 is configured to float longitudinally within the sleeve 94 along rotational axis 81. A lower end of the sleeve 94 includes a plurality of internal splines 99 (FIG. 9) configured to cooperate with external splines 100 on the shaft 82 of the valving member 48.

A manual control mechanism 102 is operably coupled to the drive shaft 80 of the actuator 54. The manual control mechanism 102 includes a manual control shaft 104 disposed perpendicular to the drive shaft 80. More particularly, the manual control shaft 104 includes a rotational axis 105 which is positioned in a horizontal plane, while the rotational axis 81 of the drive shaft 80 is disposed in a vertical plane. The control shaft 104 is coupled to a handle 106. Illustratively, the control shaft 104 includes a plurality of splines 107 which are configured to cooperate with a plurality of splines 108 formed within the handle 106. The handle 106 is secured to a first end 109 of the control shaft 104 through a conventional fastener, such as a screw 110. The handle 106 may comprise any conventional rotatable handle, such as a knob including a plurality of radially outwardly extending spokes 111. A cap 112 is received within an opening 114 formed in an end of the handle 106 and is configured to conceal the screw 110. A second end 115 of the control shaft 104 is coupled to a coupling device, such as a gear assembly 116.

Illustratively, the gear assembly 116 comprises a conventional gear reduction assembly. More particularly, the illustrative embodiment includes a gear assembly 16 providing a three-to-one gear reduction.

Figure 9:
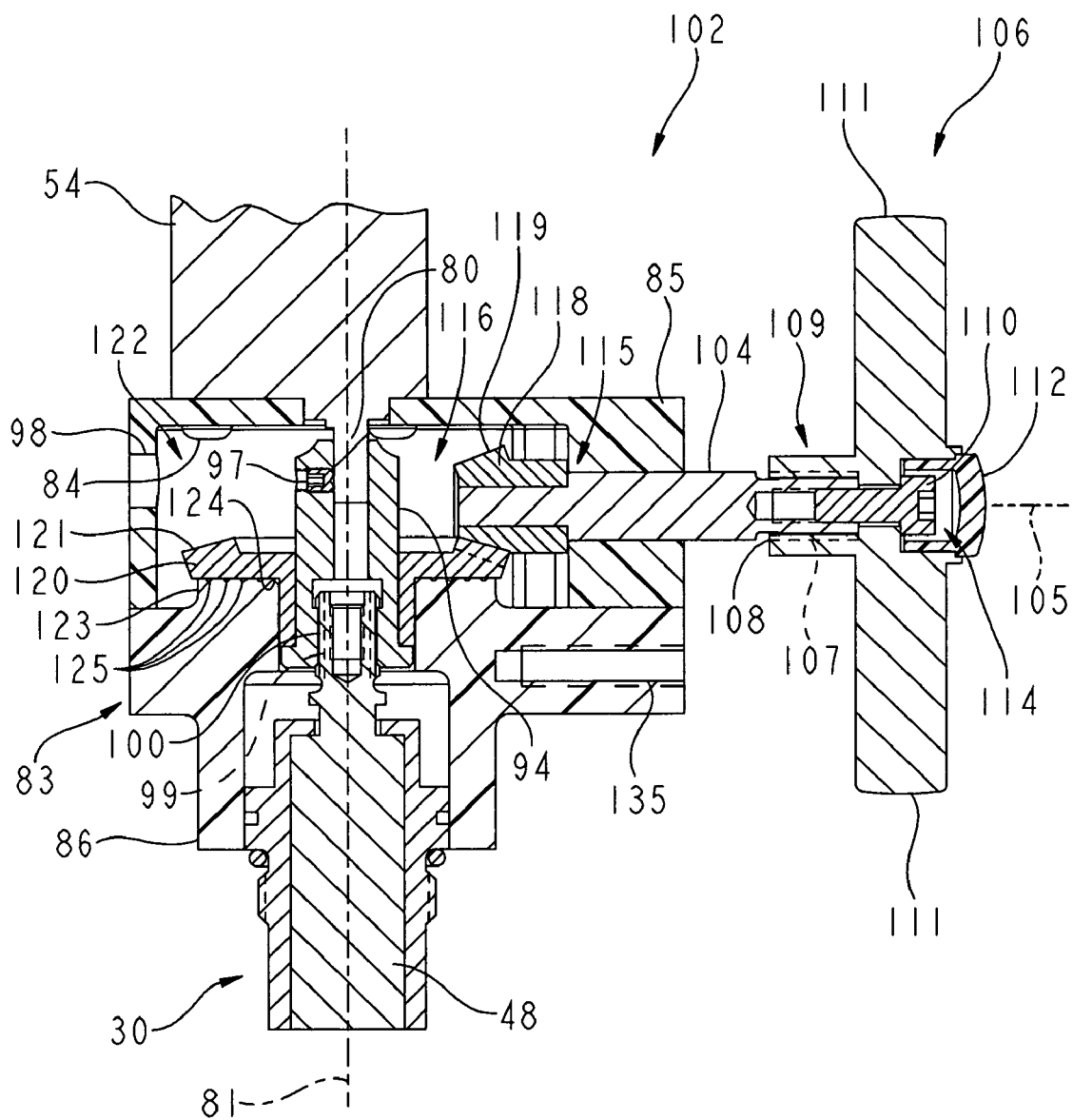
FIG. 9 is a cross-sectional view taken along line 9-9 of FIG. 7.

In the illustrative embodiment shown in FIGS. 8 and 9, the gear assembly 116 includes a first bevel gear 118 coupled to the second end 115 of the control shaft 104, and a second bevel gear 120 coupled to the sleeve 94. The first bevel gear 118 and the second bevel gear 120 include teeth 119 and 121, respectively, which are configured to intermesh. As such, rotational movement of the control shaft 104 about rotational axis 105 results in a rotational movement of the sleeve 94. In turn, the drive shaft 80 and the shaft 82 of the valving member 48 are driven in rotation about the axis 81. The gear assembly 116 is received within a chamber 122 formed by the upper mounting member 85 and the lower mounting member 86. The lower mounting member 86 illustratively includes a glide support 123 configured to support a lower surface 124 of the second bevel gear 120. The glide support 123 includes a plurality of concentrically disposed annular grooves 125. The grooves 125 may receive a conventional lubricant to assist in reducing friction in response to movement of the second bevel gear 120.

The gear assembly 116 allows for the mechanically coupled control handle 106 to be moved simultaneously with the respective valve 30, 38 by operation of the actuator 54, 56. The constant meshing of the gears 118 and 120 maintains the control handles 106 in alignment with the valves 30 and 38, respectively. Direct coupling of each actuator 54, 56 to the respective control valve 30, 38 through the in-line axis 81 of the coupling device 116 prevents both additional gear backlash error for accurate positioning of control valve 30, 38, and also provides for reduced gear wear by not transmitting valve actuation force, from the actuator 54, 56, through the gears 118 and 120. The use of a reduction bevel gear assembly 116 allows for reduced operator force when required to manually operate the water control valve 30, 38. As such, the gears 118 and 120 may be formed from a thermoplastic instead of a conventional metal, such as brass.

With this illustrative arrangement of gears 118 and 120, the manual control handles 106 are in motion whenever the actuators 54 and 56 are moving the water control valves 30 and 38. This constant movement and light loading of the gear set 116 prevents the manual control handles 106 from seizing up due to lack of movement, thereby facilitating immediate availability of the manual control mechanisms 102, if necessary.

Figure 10:
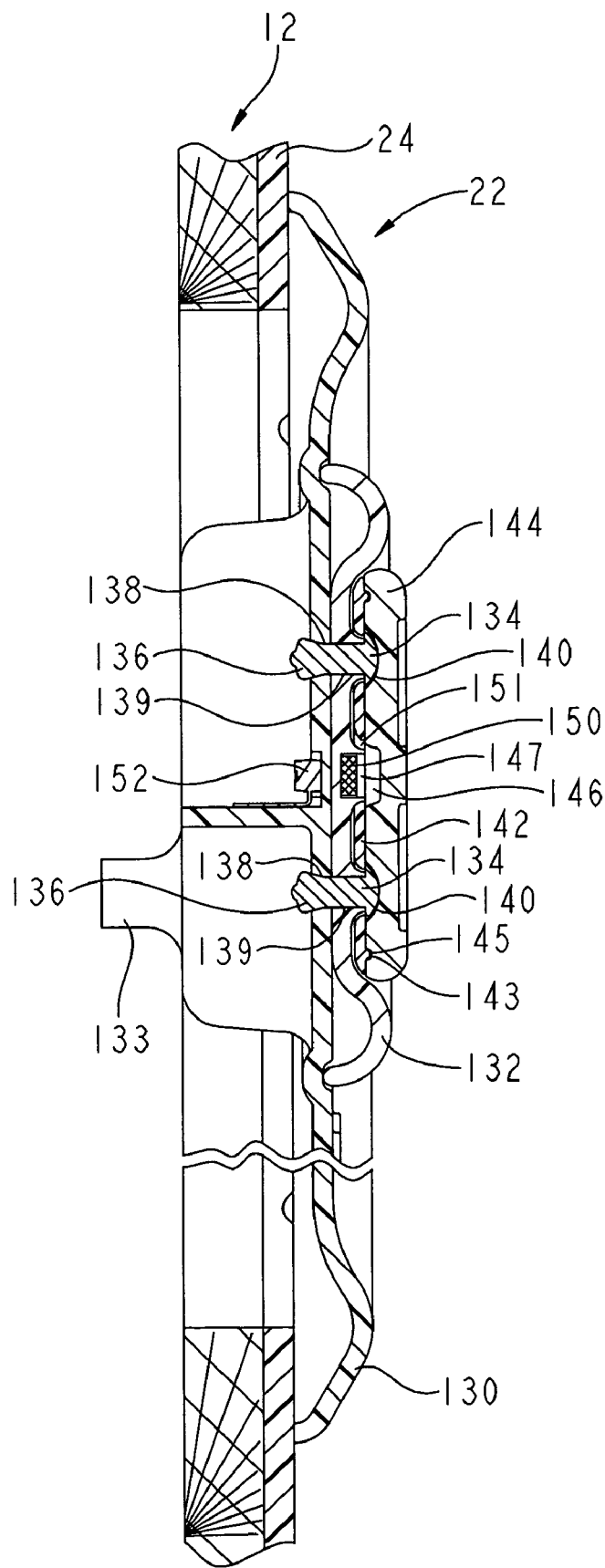
FIG. 10 is a cross-sectional view of the escutcheon assembly taken along line 10-10 of FIG. 1.
Figure 11:
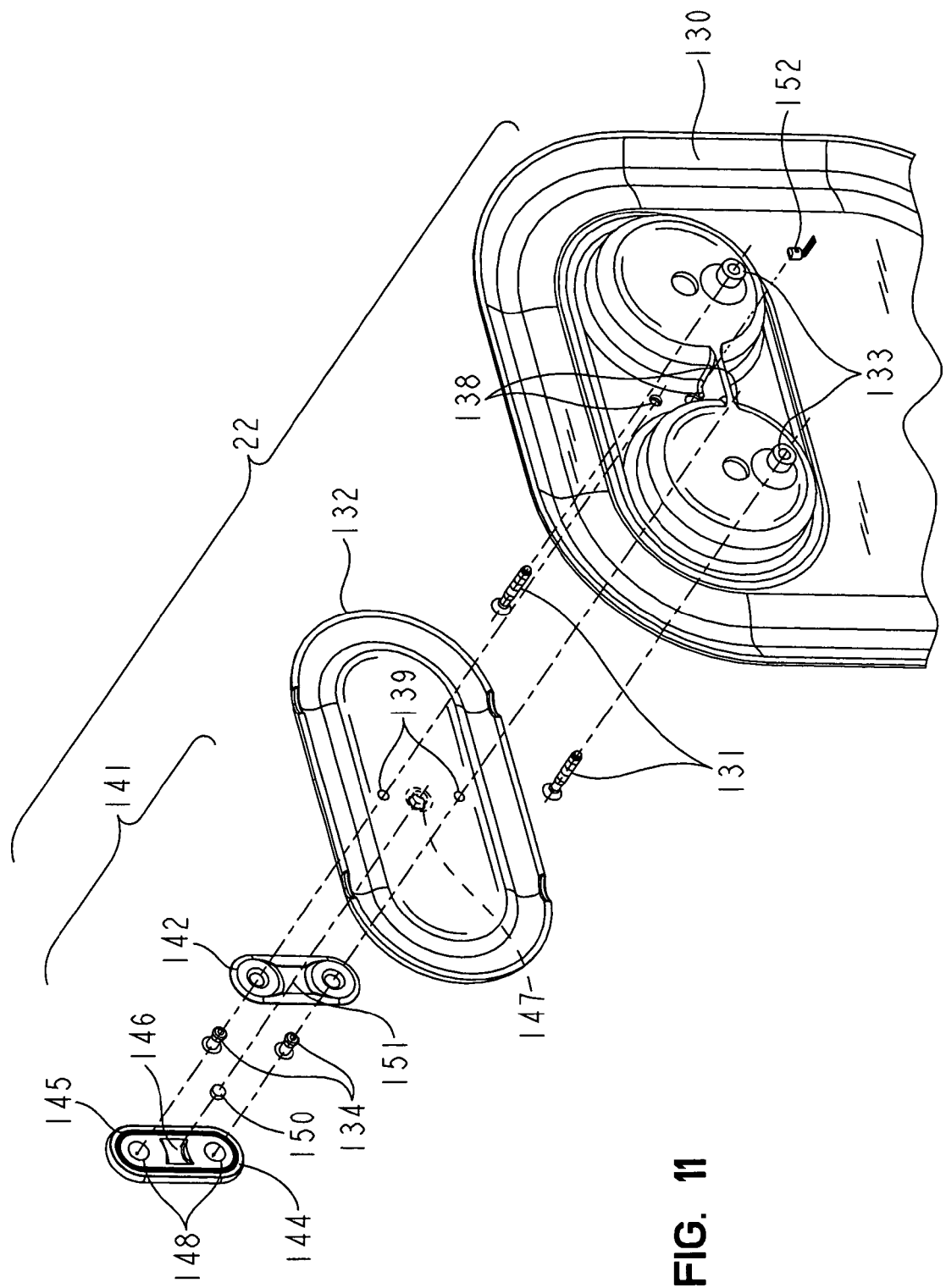
FIG. 11 is an exploded rear perspective view of the escutcheon assembly of the valve system of FIG. 1.

As noted above, in order to prevent unauthorized and possibly damaging operation of the manual control mechanism 102, the handles 106 are concealed from operator view by the escutcheon assembly 22. With reference now to FIGS. 1, 2, 10, and 11, the escutcheon assembly 22 includes an escutcheon 130 supported by the wall 12, and a removable cover 132 releasably coupled to the escutcheon 130. The escutcheon 130 is illustratively coupled to the housings 83 of the drive assemblies 50 and 52 through conventional fasteners, such as flat head screws 131 extending through standoffs 133 integrally formed with the escutcheon 130 (FIGS. 2 and 11). The screws 131 are threadably received within apertures 135 formed within the lower mounting members 86 (FIGS. 8 and 9). As such, the escutcheon 130 is removable to provide a relatively large opening for installation and service of the proportioning valve system 10.

First and second releasable fasteners 134 are configured to releasably secure the cover 132 to the escutcheon 130. Illustratively, the fasteners 134 are of a type which facilitates installation and removal of the cover 132 without tools. More particularly, as shown in FIG. 10, the fasteners 134 may comprise push rivets which include a retaining portion 136 received within openings 138 of the escutcheon 130.

The push rivets 134 include a head 140 which retains trim assembly 141 to an outer surface of the cover 132. Between the retaining portion 136 and the head 140, the push rivets 134 pass through openings 139 formed in the cover 132. In one illustrative embodiment, the push rivets 134 comprise Model No. 9082 PR 201-295 push rivet available from Heyco of the United Kingdom.

The trim assembly 141 includes a lower trim 142 which cooperates with an upper trim 144. The upper trim 144 includes a pocket 146 and a pair of recesses 148. The lower trim 142 illustratively includes a tongue 143 which is received within a groove 145 of the upper trim 144 and secured therein through a snap-fit arrangement. The recesses 148 are configured to receive the heads 140 of the fasteners 134.

A magnet 150 is supported within a cavity 147 formed in the cover 132. The cavity 147 is illustratively axially aligned with an opening 151 within the lower trim 142 and the pocket 146 of the upper trim 144. The magnet 150 cooperates with a cover sensor 152 supported by the escutcheon 130. While the cover sensor 152 illustratively comprises a Hall-effect sensor, it should be appreciated that other sensors, such as micro switches and proximity sensors, may be substituted therefor. The cover sensor 152 is operably coupled to the controller 74 and provides a signal 154 indicative of the relative positioning of the cover 132 to the escutcheon 130.

In other words, the cover sensor 152 provides a signal 154 to the controller 74 indicative of the presence or absence of the cover 132. In a normal or automatic mode of operation, the cover 132 is in place thereby concealing the manual override handles 106 and their movement. If the cover 132 is removed during normal operation, the cover sensor 152 will signal the controller 74 which then enters a manual mode of operation. In the manual mode, the actuators 54 and 56 are temporarily disabled until the cover 132 is replaced. In the event of an electric actuator control failure and/or electric power supply failure, the manual override handles 106 may be accessed by easily removing the cover 132. Since push rivets 134 are used, no tools are required for removal of the cover 132. With the cover 132 removed, the operator has full immediate control over the operation of the water control valves 30 and 38.

In a further illustrative embodiment, a light 156 (FIG. 5) may be positioned intermediate the escutcheon 130 and the cover 132 to illuminate the handles 106. More particularly, the controller 74 may activate the light 156 during the manual mode of operation when the cover 132 is removed, thereby assisting the user in locating the handles 106.

Operation of the manual control mechanism 102 begins with removal of the cover 132 from the escutcheon 130. The cover sensor 152 then provides signal 154 to the controller 74 indicating that the cover 132 has been removed. In response, the controller 74 enters the manual mode, thereby preventing further operation of the actuators 54 and 56.

During a failure of either of the actuators 54 and 56 or interruption of power to the actuators 54 and 56, the respective valves 30 and 38 may be controlled through the manual control mechanisms 102. Rotating the handles 106 causes the respective control shafts 104 to rotate. Rotation of the control shafts 104 causes the first bevel gear 118 to rotate about rotational axis 105, thereby causing the second bevel gear 120 to rotate about rotational axis 81. Rotation of the second bevel gear 120 causes the sleeve 94 and corresponding drive shaft 80 to rotate. Rotation of the sleeve 94 causes the valve member 48 to rotate, thereby controlling the flow of water through the respective valve 30, 38.

Although the invention has been described in detail with reference to certain preferred embodiments, variations and modifications exist within the spirit and scope of the invention as described and defined in the following claims.

What is claimed is:

1. A valve assembly configured to be positioned within a wall including an access opening, the valve assembly comprising:
a valve configured to be coupled to a water source, the valve including a movable valve member configured to control the flow of water therethrough;
an electric actuator operably coupled to the valve and configured to move the valve member;
a cover configured to be supported by the wall to conceal the access opening;
a sensor configured to detect the position of the cover relative to the access opening and generate a signal indicative thereof; and
a controller in electrical communication with the sensor and configured to selectively disable operation of the electric actuator in response to the signal from the sensor indicative of the position of the cover relative to the access opening.

2. The valve assembly of claim 1, further comprising a light positioned behind the wall and which is activated by the controller when the cover is not detected by the sensor.

3. The valve assembly of claim 1, wherein the actuator comprises an electric motor.

4. The valve assembly of claim 1, further comprising a manual control mechanism operably coupled to the valve member, the manual control mechanism including a control shaft and a handle configured to rotate the control shaft.

5. The valve assembly of claim 1, further comprising an escutcheon supported by the wall and operably coupled to the cover, the sensor being supported by the escutcheon.

6. The valve assembly of claim 5, further comprising coupling members supported by the escutcheon and configured to releasably secure the cover to the escutcheon.

7. The valve assembly of claim 1, wherein the controller is in a manual mode of operation when the sensor detects that the cover is removed from the access opening.

8. The valve assembly of claim 7, wherein the controller is in an automatic mode of operation when the sensor detects that the cover is concealing the access opening.

9. The valve assembly of claim 1, further comprising a magnet supported by the cover, and wherein the sensor comprises a Hall-effect sensor configured to detect the magnet.

10. A valve assembly configured to be positioned within a wall behind an access opening, the valve assembly comprising:
a first valve configured to be coupled to a first fluid source, the first valve including a movable valve member configured to control the flow of a first fluid therethrough;
a first actuator operably coupled to the first valve and configured to move the valve member of the first valve in an automatic mode of operation;
a first manual handle accessible through the access opening and operably coupled to the first valve, the first manual handle being configured to move the valve member of the first valve in a manual mode of operation;
a cover configured to be supported by the wall to conceal the first manual handle;
a cover sensor configured to detect the position of the cover relative to the access opening; and
a controller in communication with the cover sensor and configured to operate in the manual mode of operation when the cover sensor does not detect the cover.

11. The valve assembly of claim 10, wherein the controller is configured to operate in the automatic mode of operation when the cover sensor detects the cover.

12. The valve assembly of claim 10, further comprising a light which is activated by the controller when in the manual mode of operation.

13. The valve assembly of claim 10, wherein the first actuator comprises an electric motor.

14. The valve assembly of claim 10, further comprising:
a second valve configured to be coupled to a second fluid source, the second valve including a movable valve member configured to control the flow of a second fluid therethrough;
a second actuator operably coupled to the second valve and configured to move the valve member of the second valve in the automatic mode of operation; and
a second manual handle accessible through the access opening and operably coupled to the second valve, the second manual handle being configured to move the valve member of the second valve in the manual mode of operation.

15. The valve assembly of claim 14, further comprising:
a first fluid sensor configured to measure at least one characteristic of the first fluid;
a second fluid sensor configured to measure at least one characteristic of the second fluid; and
wherein in the automatic mode of operation, the controller is configured to operate in at least a feed forward manner providing for movement of the valve member of the first valve and the valve member of the second valve based on the at least one characteristic of the first fluid and the at least one characteristic of the second fluid.

16. The valve assembly of claim 15, wherein the at least one characteristic of the first fluid includes at least one of the temperature of the first fluid and the pressure of the first fluid, and the at least one characteristic of the second fluid includes at least one of the temperature of the second fluid and the pressure of the second fluid.

17. The valve assembly of claim 10, further comprising an escutcheon supported by the wall and operably coupled to the cover, the cover sensor being supported by the escutcheon.

18. The valve assembly of claim 17, further comprising coupling members supported by the escutcheon and configured to releasably secure the cover to the escutcheon.

* * * * *